United States Patent [19]

Leschke et al.

[11] Patent Number: 4,821,668
[45] Date of Patent: Apr. 18, 1989

[54] REAR COVER INCLUDING WARNING DEVICE FOR A MOTOR VEHICLE

[75] Inventors: Harald Leschke; Heinz Baumert; Rudi Kneib, all of Sindelfingen, Fed. Rep. of Germany

[73] Assignee: Daimler-Benz Aktiengesellschaft, Stuttgart, Fed. Rep. of Germany

[21] Appl. No.: 82,219

[22] Filed: Aug. 6, 1987

[30] Foreign Application Priority Data

Aug. 9, 1986 [DE] Fed. Rep. of Germany ....... 3627100

[51] Int. Cl.$^4$ .................. B60R 01/06; G02B 05/12
[52] U.S. Cl. .................................. 116/28 R; 40/582; 116/209; 350/97
[58] Field of Search ................... 116/28 R, 65 T, 209; 40/612, 582; 350/97; 296/97 B

[56] References Cited

U.S. PATENT DOCUMENTS

| | | | |
|---|---|---|---|
| 2,259,272 | 10/1941 | Sholkin et al. | 40/611 |
| 3,670,438 | 6/1972 | Carroll et al. | 40/556 |
| 3,924,344 | 12/1975 | Davis | 40/611 X |
| 4,044,482 | 8/1977 | Mosch | |
| 4,219,141 | 8/1980 | Lovy | 116/28 R X |
| 4,374,376 | 2/1983 | Pillifant, Jr. | 116/28 R X |
| 4,708,388 | 11/1987 | Zacharczue | 296/97 B |
| 36443,056 | 4/1984 | Sullivan | 350/97 X |

FOREIGN PATENT DOCUMENTS 1956025 5/1971 Fed. Rep. of Germany .
2049767 12/1980 United Kingdom .

Primary Examiner—Daniel M. Yasich
Attorney, Agent, or Firm—Barnes & Thornburg

[57] ABSTRACT

On the inside of a rear cover or the like, a motor vehicle has an extractably arranged warning triangle behind which there is a further solidly attached warning triangle which becomes visible after removal of the extractable warning triangle, so that the vehicle is protected while following traffic is warned.

8 Claims, 2 Drawing Sheets

Fig.1(A)
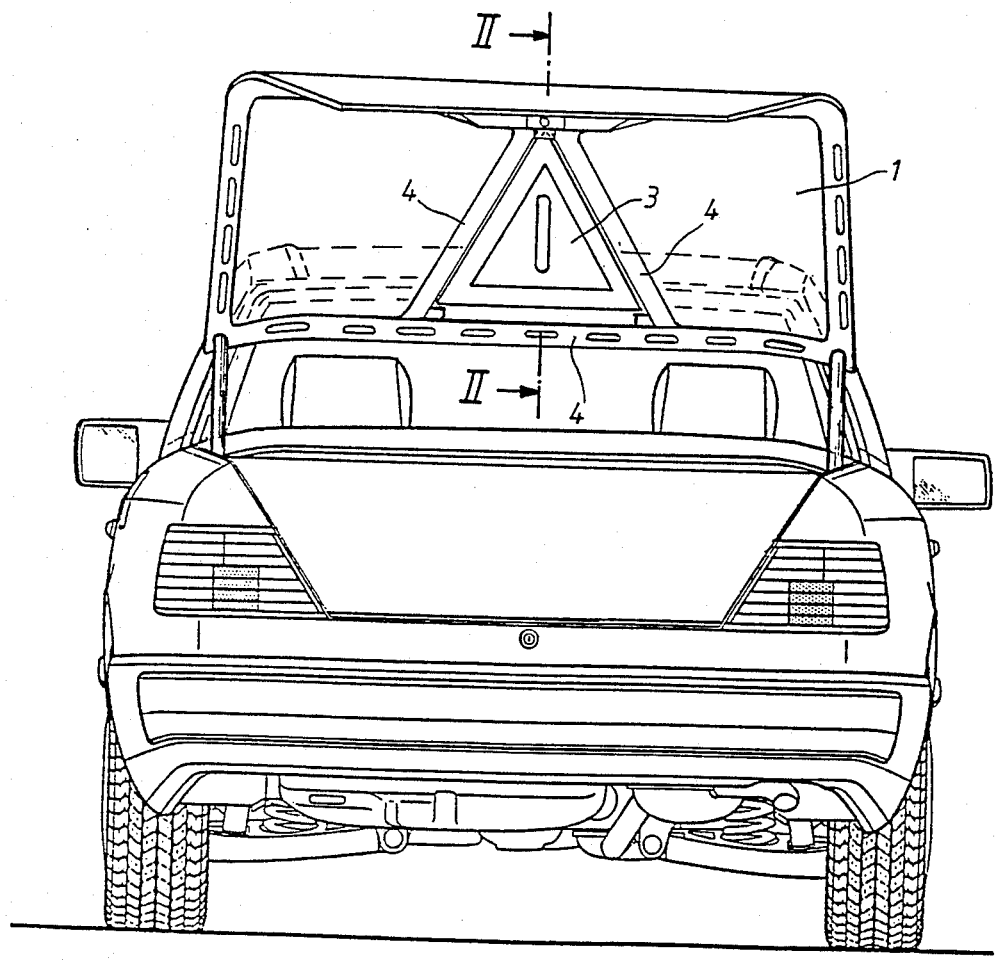
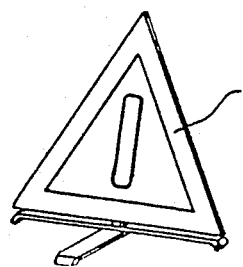
Fig.1(B)

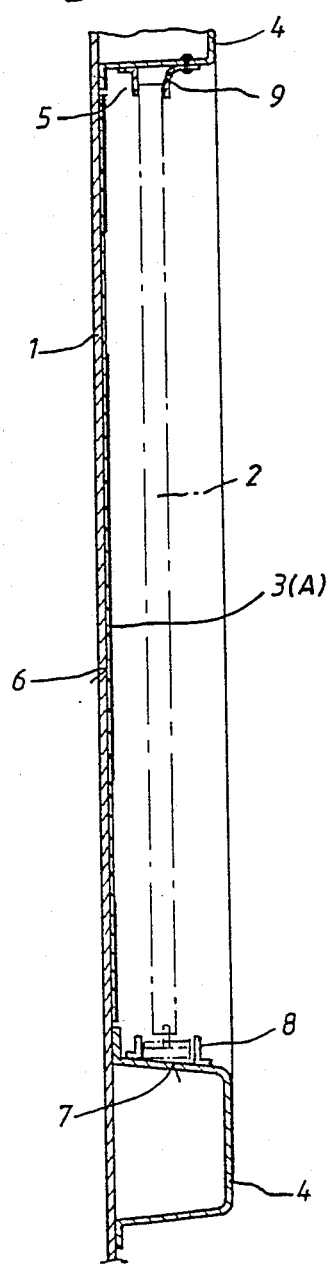
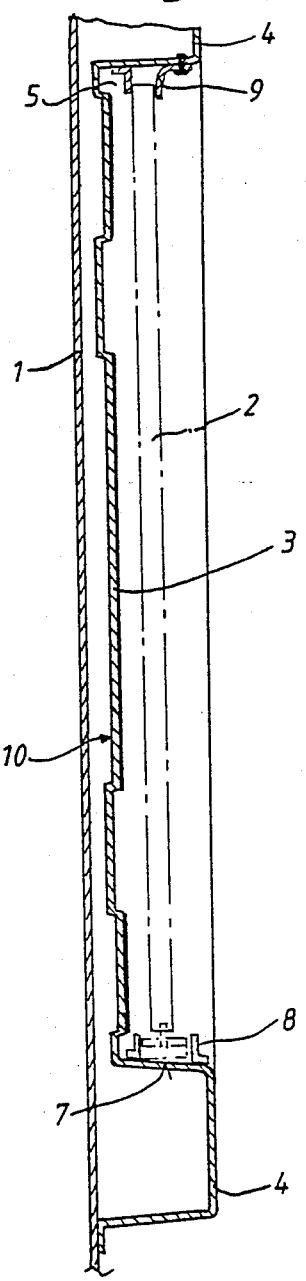

REAR COVER INCLUDING WARNING DEVICE FOR A MOTOR VEHICLE

BACKGROUND AND SUMMARY OF THE INVENTION

The present invention relates to a rear cover for a motor vehicle, on whose inner side an extractable warning triangle is arranged so that it is visible to following traffic with the cover opened.

Such an arrangement of a warning triangle is known from German Published Unexamined Patent Application No. 1,956,025. A vehicle equipped in such a manner, however, is itself unprotected in the period where the warning triangle is removed, perhaps during a breakdown, and set up a specified distance, for example 100 m behind the vehicle. When the rear cover is open, the warning triangle is visible at the cover. When the warning triangle is removed from the cover for placing on the ground, nothing is available in the cover to indicate any warning. Until the warning triangle is placed in the ground, no warning is present. Even in this short period, a dangerous situation can arise under unfavorable visual conditions because of the vehicle not being specially marked.

From U.S. Pat. No. 4,044,482, a vehicle is also known whose rear cover is provided on the inside with a warning sign which only warns the following traffic of the stationary vehicle when the rear cover is open. This warning sign is produced by a plate fastened at this point or by a directly applied coating.

An object of the present invention is, therefore, to make a vehicle having a rear cover with an extractable warning triangle, such that the vehicle itself is marked while also providing a warning to approaching traffic.

This and other objectives are achieved in the present invention by providing a further, solidly attached warning triangle behind the extractable warning triangle, this solidly attached triangle being visible after removal of the extractable warning triangle.

By this invention, it is possible to specially mark the stationary vehicle by means of the warning triangle attached to the cover or the like simply by folding up the cover while the extractable warning triangle makes the approaching traffic aware of the need to expect a vehicle which is hindering the traffic.

Other objects, advantages and novel features of the present invention will become apparent from the following detailed description of the invention when considered in conjunction with the accompanying drawings.

BRIEF DESCRIPTION OF THE DRAWINGS

FIG. 1(A) shows a warning triangle according to the present invention connected to the inner side of a motor vehicle cover, and FIG. 1(B) shows an extracted warning triangle.

FIG. 2 shows, in a section along line II—II of FIG. 1, a preferred embodiment of the present invention with a solidly attached warning triangle on the inner side of a cover.

FIG. 3 shows, in a section along line II—II of FIG. 1, another preferred embodiment of the present invention with a warning triangle formed into an additional panel.

DETAILED DESCRIPTION OF THE DRAWINGS

As seen in FIG. 1(A), a receiving feature for an extractable warning triangle 2 is provided on the inside of a metal boot cover 1 of a motor vehicle. Since this warning triangle 2 (in the case of a breakdown, for example) is extracted and set up behind the motor vehicle and at a distance from it in order to warn the following traffic (as seen in FIG. 1(B)), a further warning triangle 3 is solidly attached in the space behind the extractable warning triangle 2 in order to protect the vehicle itself.

This further warning triangle 3 is located between hollow support type stiffeners 4 which are fastened in a triangular shape on the boot cover 1. These stiffeners 4 form a receiving space 5 for the extractable warning triangle 2.

FIGS. 2 and 3 show two different embodiments of the solidly attached warning triangle 3.

In FIG. 2, material showing a warning triangle 3(A) is applied or fixed in an inner surface 6 of the boot cover 1. This material can consist of paint, an adhesive sheet, or even an appropriately coated additional plate.

The extractable warning triangle 2, here shown by a chain-dotted line, is inserted in the receiving space 5 over the solidly attached warning triangle 3. The extractable triangle 2 is supported on a contact surface 7 of the stiffener 4 and is fastened there by angle sections 8 on one side of the triangle and is restrained by a pivotable latch 9 at the opposite cover. FIG. 3 shows a boot cover in which an additional panel 10 is connected to the stiffeners 4. The contour of warning triangle 3, whose surface is additionally marked in color, is shaped into this additional panel.

The extractable warning triangle 2 is held, as in the embodiment of FIG. 2, by angle sections 8 in the receiving space 1.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A rear cover for a motor vehicle including: extractable warning means which is provided in a preselected position so as to be visible to the following traffic when the cover is open; and further, solidly attached warning means on the cover which is visible when said extractable warning means is removed from the cover and said cover is open.

2. A rear cover according to claim 1, wherein said extractable warning means and said solidly attached warning means are triangles.

3. A rear cover according to claim 1, wherein said solidly attached warning means is an adhesive sheet.

4. A rear cover according to claim 1, wherein said solidly attached warning means is painted onto an inner surface of said cover.

5. A rear cover according to claim 1, wherein said solidly attached warning means is an internal intermediate panel connected to said cover and is marked in color.

6. A rear cover according to claim 1, further including internal, hollow support type stiffener means arranged in a triangular shape for solidly holding said solidly attached warning means between said stiffener means.

7. A rear cover according to claim 6, wherein said extractable warning means is also located between said stiffener means.

8. A rear cover according to claim 7, wherein said stiffener means form contact surfaces for sides of said extractable warning means.

* * * * *